United States Patent [19]

Chisholm

[11] Patent Number: 5,014,186

[45] Date of Patent: May 7, 1991

[54] DATA-PROCESSING SYSTEM HAVING A PACKET TRANSFER TYPE INPUT/OUTPUT SYSTEM

[75] Inventor: Douglas R. Chisholm, Delray Beach, Fla.

[73] Assignee: International Business Machines Corporation, Armonk, N.Y.

[21] Appl. No.: 250,996

[22] Filed: Sep. 27, 1988

Related U.S. Application Data

[63] Continuation of Ser. No. 891,845, Aug. 1, 1986, abandoned.

[51] Int. Cl.[5] .......................... G06F 3/00; G06F 13/00
[52] U.S. Cl. .................... 364/200; 364/239.2; 364/239.3; 364/240.1; 364/240.3; 364/284.2
[58] Field of Search ............................ 364/200, 900

[56] References Cited

U.S. PATENT DOCUMENTS

| 3,956,739 | 5/1976 | Ophir et al. | 364/200 |
|---|---|---|---|
| 4,120,029 | 10/1978 | Steiner | 364/200 |
| 4,126,897 | 11/1978 | Capowski | 364/200 |
| 4,195,342 | 3/1980 | Joyce | 364/200 |
| 4,296,464 | 10/1981 | Woods et al. | 364/200 |
| 4,426,679 | 1/1984 | Yu et al. | 364/200 |
| 4,509,113 | 4/1985 | Heath | 364/200 |
| 4,534,011 | 8/1985 | Andrews et al. | 364/900 |
| 4,677,616 | 6/1987 | Franklin | 370/94 |

Primary Examiner—Gareth D. Shaw
Assistant Examiner—John C. Loomis

[57] ABSTRACT

In a data processing system having a system bus for coupling I/O units to a system storage unit, there is provided a mechanism for supplying to the I/O units a line size signal representing the line size of the system storage unit. A further mechanism is located in at least one of the I/O units for responding to this line size signal for adjusting the data transfer size of the I/O unit to match the system storage unit line size.

8 Claims, 5 Drawing Sheets

DATA-PROCESSING SYSTEM HAVING A PACKET TRANSFER TYPE INPUT/OUTPUT SYSTEM

This is a continuation of co-pending application Ser. No. 06/891,845 filed on Aug. 1, 1986, now abandoned.

1. Technical Field

This invention relates to digital data processing systems and particularly to the manner in which input/output (I/O) units of a digital data processing system transfer data to and from a system storage unit.

2. Background Art

It is known to use direct memory access (DMA) and cycle stealing methods for transferring data from an input/output (I/O) unit to the main storage unit of a digital computer and vice versa. In a typical cycle stealing method, for example, the I/O unit, which is coupled to the I/O bus of the computer or processor, sends a data transfer request signal to the processor. When the main storage unit becomes available and the processor is ready to proceed, the processor sends an acknowledgement signal back to the I/O unit telling it to proceed with the data transfer. The I/O unit then sends a storage address to the main storage unit and a word of data is transferred from the I/O unit to the main storage unit or vice versa. This process is repeated for each data word to be transferred.

It has been proposed to improve the efficiency of this type of I/O operation by using a so-called packet transfer method. In this case, not just one data word, but rather a sequence of several data words are transferred to or from the main storage unit for each such data transfer request. In other words, for each data transfer request, the I/O unit sends a single starting address followed by a sequence of several data words to the main storage unit for the case of a write to storage operation. For the case of a read from storage operation, the I/O unit sends a single starting address to the main storage unit and the main storage unit sends back to the I/O unit a sequence of several data words.

A problem has been encountered with the use of this packet transfer method. In order for the method to work efficiently and with a minimum of circuit complications, it is necessary that the number of data words per packet matches the data word line size of the main storage unit. In other words, the number of data words per packet should be the same as the number of data words which are handled by the main storage unit during a single storage operation of the main storage unit. A problem arises in practice in that different types of I/O units sometimes have different data transfer sizes (data words per packet). Also, it is sometimes desired to use an I/O unit having a given data transfer size (data words per packet) in a data processing system wherein the main storage unit has a different non-matching storage line size.

It is generally undesirable to require that different types of processors all have the same storage line sizes, since this would prevent the use of more efficient storage implementations for processors having different operating requirements. In a similar manner, it is undesirable to require that all I/O units have the same packet size. This would prevent the use of I/O implementations that may be more cost effective for particular applications.

SUMMARY OF INVENTION

This invention provides novel mechanisms for enabling a given packet transfer type I/O unit to be used with different data processing systems having different storage unit line sizes. This invention provides novel mechanisms for enabling I/O units to automatically adjust their data transfer sizes (data words per packet) to match the storage unit line size of the data processing system to which they are coupled. This is accomplished by including in the data processing system a mechanism for supplying to the I/O units a line size signal representing the line size of the system storage unit and by providing in the I/O units a mechanism which is reponsive to this line size signal for adjusting the data transfer size of the I/O unit to match the system storage unit line size.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figure 1:
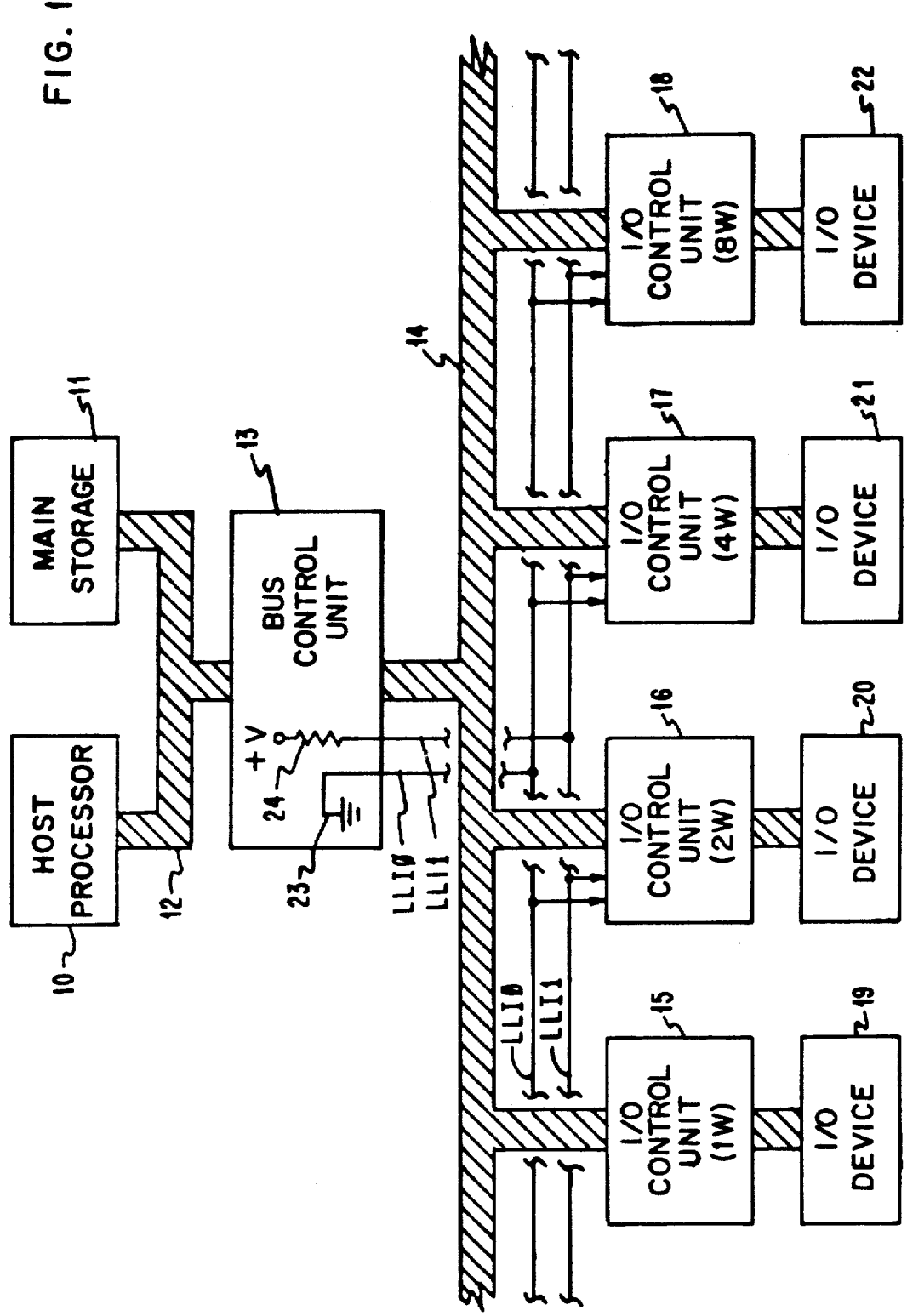
FIG. 1 is a schematic block diagram of a data processing system constructed in accordance with the present invention.

Referring to FIG. 1, there is shown a representative embodiment of a data processing system constructed in accordance with the present invention. This system includes a host processor 10 and a system storage unit 11 which are coupled in parallel to a multi-conductor processor bus 12 which runs to a bus control unit 13. The system storage unit 11 is sometimes referred to as the main storage unit. It is the primary read/write storage for the host processor 10.

The processor bus 12 is coupled by way of the bus control unit 13 to a multi-conductor system bus 14. Coupled in parallel to the system bus 14 are various I/O units 15, 16, 17 and 18. I/O devices 19, 20, 21 and 22 are respectively coupled to different ones of the I/O units 15, 16, 17 and 18.

Among other things, system bus 14 serves to couple the I/O units 15–18 to the system storage unit 11 via the bus control unit 13 and the processor bus 12. System bus 14 may include, for example, a multi-bit data bus, a multi-bit address bus, a plural-bit command bus, a plural-bit status bus and various and sundry control lines, handshaking signal lines and the like. In some embodiments, such as the one described hereinafter, a single time multiplexed address/data bus may be used in place of separate address and data busses. Similarly, a single time multiplexed command/status bus may be used in place of the two separate busses.

In addition to passing data words, addresses and the like from one to the other of the processor bus 12 and the system bus 14, the bus control unit 13 also includes a bus arbitration mechanism for deciding which one of the I/O units 15–18 will be allowed to use the system bus 14 in the event that two or more of them ask to use the system bus 14 at the same time. When an I/O unit wants to use the system bus 14, it activates a request line in the system bus. If two or more requests are pending at the same time, the bus control unit 13 applies a predetermined selection algorithm to select the I/O unit which will be allowed to go first. It then sends an acknowledgement signal over an appropriate acknowledgement line in the system bus 14 to the selected I/O unit. The selected I/O unit can then commence to use the system bus 14. If no other requests are received in the interim, then the second I/O unit will be allowed to use the system bus 14 when the first I/O unit is finished with it. Various I/O unit selection algorithms and mechanisms are well-known in the art and need not be shown or described herein.

Each of the I/O units 16, 17 and 18 is of the packet transfer type. As such, each transfers a packet of time sequential data words to or from the system storage unit 11 each time it requests and is granted use of the system bus 14 for normal data transfer purposes. For the sake of example, I/O unit 16 is assumed to transfer two-word (2W) packets, I/O unit 17 is assumed to transfer four-word (4W) packets, and I/O unit 18 is assumed to transfer eight-word (8W) packets. These assumptions are for the case of normal operation in the absence of the present invention. By "word" is meant "data word". In addition, each packet includes an initial address segment or field which contains a starting address for the system storage unit 11. Representative packets for I/O units 16 and 17 are shown in the bottom line of FIG. 2, wherein "A" denotes an address word and "D" denotes a data word.

The assumed normal operating mode for I/O unit 15 is to transfer one data word for each starting address sent to the system storage unit. For convenience here, this is referred to as a one-word packet. It is recognized, of course, that this one-word packet type of transfer is essentially what is done in known cycle stealing methods. In other words, in known cycle stealing methods, one data word is transferred for each starting address sent to the system storage unit.

Figure 2:
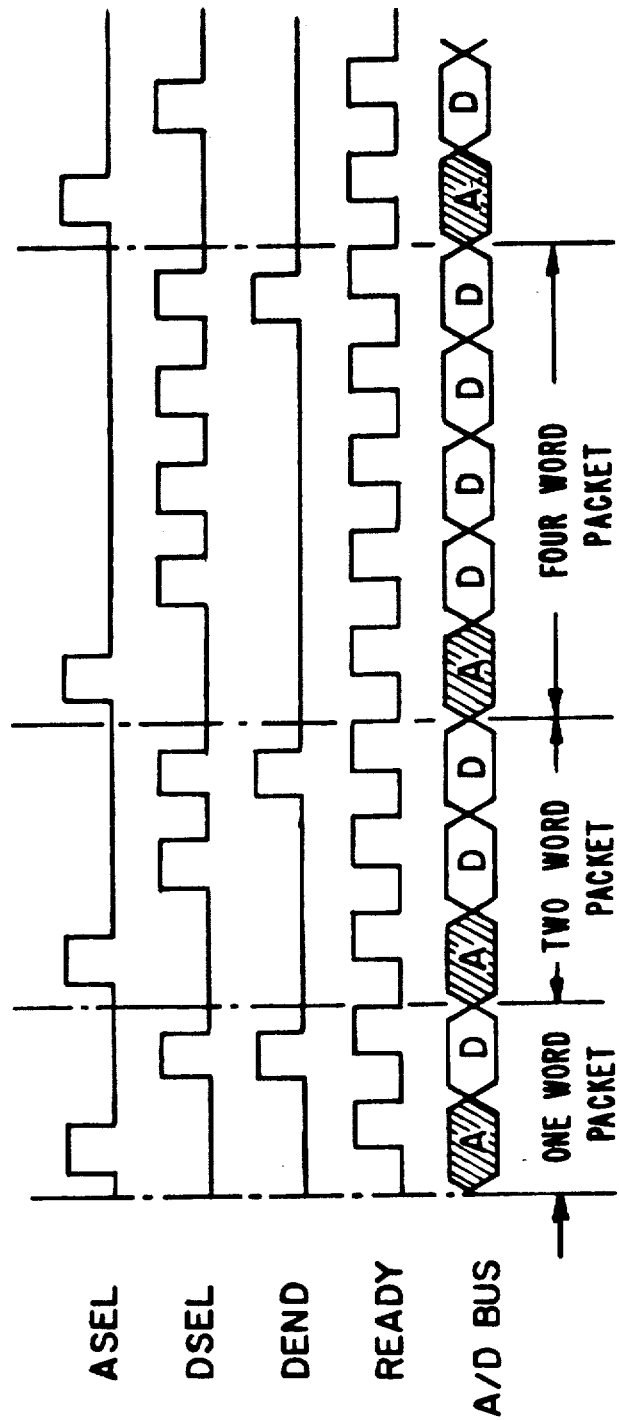
FIG. 2 is a timing diagram used in explaining the operation of the FIG. 1 embodiment.

The advantage of multi-word packets can be seen from the bottom line in FIG. 2. More data is transferred per starting address. Also, more data is transferred for each request/acknowledgement procedure which is done to enable the I/O unit to get access to the system bus and hence to the system storage unit.

The address words and data words shown in FIG. 2 are multi-bit words. Each word may be comprised of, for example, 4 bytes (32 bits) plus an additional parity bit for each byte. In the embodiment described herein, a single time multiplexed bus is used for both the address words and the data words. This address/data (A/D) bus is assumed to be a 36-bit bus (32 information bits plus 4 parity bits). In accordance with the normal practice of not mentioning the parity bits, this A/D bus will be hereinafter referred to as a 32-bit bus. The processor bus 12 also includes a 32-bit (actually 36-bit) address/data bus for transferring the same address and data words to and from the system storage unit 11. All 32 bits of each word are transferred from the control unit to the system storage unit or vice versa in a parallel manner.

The system bus 14 is an asynchronous bus and a select/ready handshaking routine is used for moving the address and data words from the I/O unit to the system storage unit or vice versa for the case of the data words. This handshaking procedure is illustrated in the timing diagram of FIG. 2. The I/O unit puts an address word on the system bus 14 and issues an ASEL (address select) signal to the bus control unit 13. The bus control unit 13 responds with a Ready (RDY) signal when the address has been accepted. For a system storage unit write operation, the I/O unit then places a data word on the system bus 14 and issues a DSEL (data select) signal to the bus control unit 13 via a DSEL control line in the bus 14. The bus control unit 13 thereafter responds with another ready signal when the data word has been accepted. This DSEL/Ready sequence is repeated for each additional data word in the packet.

For the case of a system storage unit read operation, the data word moves in the opposite direction, namely, from the system storage unit 11 to the I/O unit. In this case, the DSEL signal indicates that the I/O unit is ready to receive a data word and the resulting Ready signal indicates that a valid data word has been placed on the system bus 14 by the bus control unit 13. In this manner, the Select/Ready handshaking sequence paces the movement of the address and data words. An additional signal, called DEND (data end) is issued by the I/O unit on a separate bus control line to notify the bus control unit 13 that the word being transferred is the last word in the packet.

In the example shown in FIG. 2, the ends of the packets are shown as being contiguous. It is understood, of course, that there may be time gaps between successive packets during which the system bus 14 is in an idle condition.

In accordance with the present invention, the data processing system of FIG. 1 includes means for supplying to the I/O units a line size signal representing the line size of the system storage unit 11. In the present embodiment, this includes a pair of signal conductors LLI$\phi$ and LLI1, which are included as part of the system bus 14 and which, when taken together, provide a plural-bit binary coded line length indicator (LLI) signal representing, by number of words, the line size of the system storage unit 11. If the system storage unit 11 uses an error checking and correction (ECC) mechanism, then the system storage unit "line size" is the number of data words stored into the system storage unit for which there is provided an accompanying error checking and correction code field or segment. In this case, the line size is the number of data words per ECC word. If an error checking and correction mechanism is not used, then the system storage unit line size is the number of words which are read out or written into storage during any given access of the storage unit.

The line length indicator (LLI) lines LLI$\phi$ and LLI1 are preprogrammed in accordance with the system storage unit line size by connecting to a voltage source +V and by grounding the appropriate ones of the lines. In the illustrated case, the LLI$\phi$ line is grounded by way of a ground connection 23 and the LLI1 line is connected to a positive voltage source +V by way of a resistor 24. This provides on the LLI lines a binary value of "10". By way of example, this represents a system storage unit line size of four words (four data words). The coding scheme used in the present embodiment is to have a code of "00" represent a one-word line size, a coding of "01" represent a two-word line size, a coding of "10" represent a four-word line size, and a coding of "11" represent an eight-word line size. Other coding schemes may, of course, be used. Also, when needed, more than two LLI lines may be used.

In this illustrated embodiment, the line size signal is supplied via separate dedicated signal conductors LLI$\phi$ and LLI1 associated with the system bus 14 and dedicated and used exclusively for the purpose of providing the line size signal. An alternative implementation which may sometimes be used to advantage is to supply the line size signal via a status byte which is transferred over the system bus 14 to the I/O control unit. Many systems already include, as part of the system bus, a status bus for transferring status information between the bus control unit and the I/O unit. In this case, as part of the initial setup of the system, a special status byte representing the line size of the system storage unit could be transferred from the bus control unit to the I/O unit over the status bus included in the system bus 14. This would be done immediately following the power-on of the system and as part of the initial setup or initial loading of the system. The line length indicator portion of this status byte would be received by and retained in an LLI register located in each I/O unit. The LLI value in this register would thereafter be used in the same manner as the LLI value provided by the LLI$\phi$ and LLI1 conductors shown in FIG. 1.

In accordance with the present invention, the data processing system being described herein includes means located in at least one of the I/O units 15-18 and responsive to the line size signal (LLI signal) for adjust-in the data transfer size of the I/O unit to match the line size of the system storage unit 11. The term "data transfer size" means the number of data words that are transferred between the I/O unit and the system storage unit per storage request by the I/O unit. In the present embodiment, this means the number of data words per packet for the particular I/O unit being considered.

Figures 3, 3A:
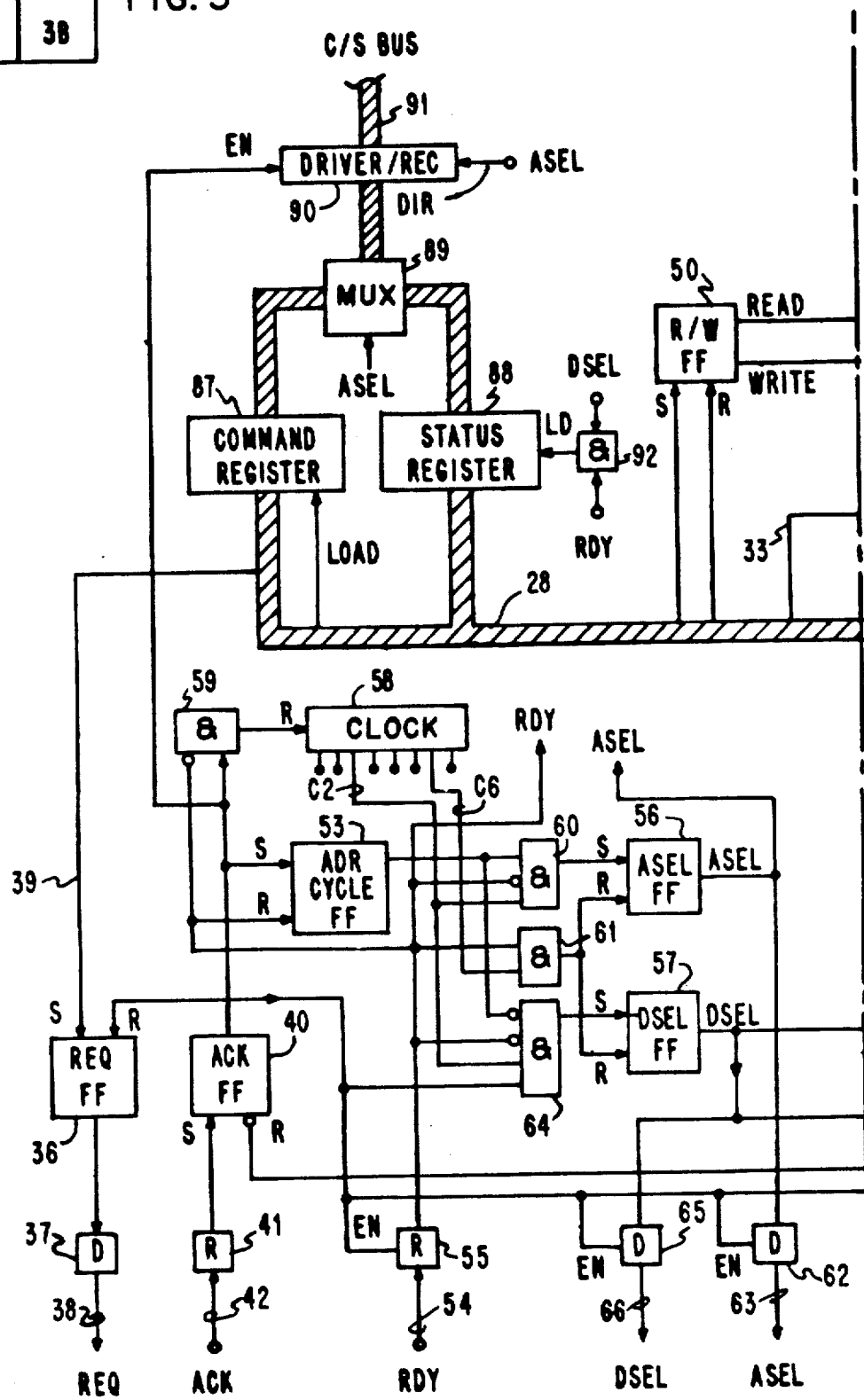
FIG. 3 is a schematic block diagram showing the relationship of FIGS. 3a and 3b which together show in greater detail the internal construction of one of the I/O control units of FIG 1.
FIG. 3a and 3b together show the internal construction of one of the I/O control units of FIG. 1 according to the present invention.
Figure 3B:
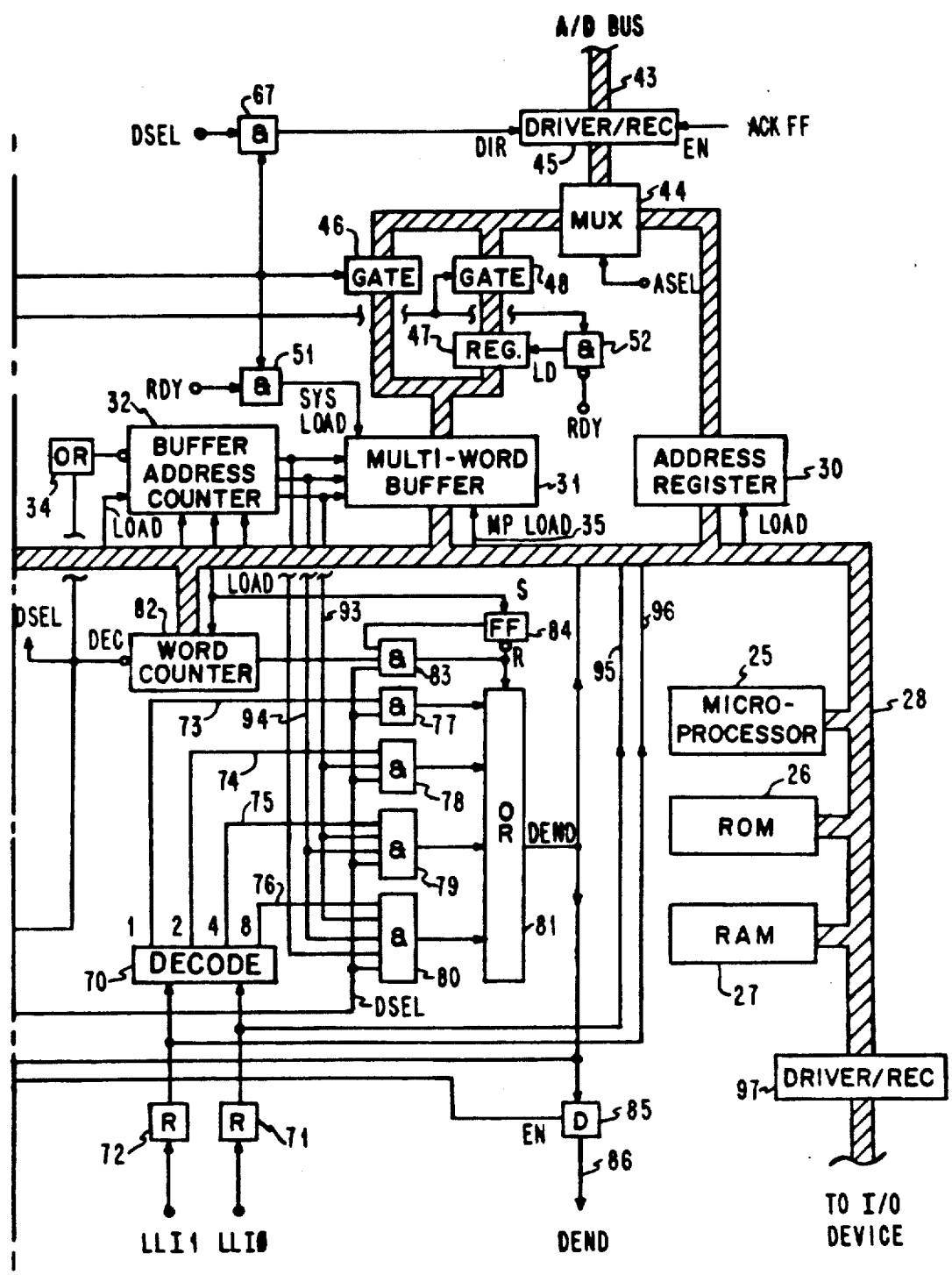

Referring now to FIG. 3, there is shown some of the details of the internal logic for one of the I/O control units 15-18 of FIG. 1. Only that portion of the internal logic which is necessary to an understanding of the present invention is shown in FIG. 3. Thus, it is to be understood that a complete I/O control unit will normally contain additional logic for performing various and sundry other functions.

The I/O control unit of FIG. 3 includes a microprocessor 25, a read-only memory (ROM) unit 26, and a random access memory (RAM) unit 27, coupled in parallel to a multi-conductor microprocessor bus 28. ROM 26 includes the control program which supervises and controls the internal operations of the I/O control unit. RAM 27 includes various registers, buffers, temporary storage areas and the like, which are used when performing various functions within the I/O control unit.

The I/O control unit of FIG. 3 also includes address register means 30 for holding a system storage unit starting address. The address word for a packet to be transferred is loaded into this register 30 from an address counter which, for present purposes, can be assumed to be a software counter located in the RAM unit 27. This software counter is updated each time an address word is loaded into the register 30 so as to be ready to provide the starting address for the next packet.

The I/O control unit of FIG. 3 further includes buffer means for holding a plurality of data words. This buffer means is represented by a multi-word buffer 31 which may take the form of a small random-access storage unit capable of reading or writing a complete data word during any given access thereof. Associated with the buffer 31 is a buffer address counter 32 which provides the address which selects the word location to be accessed in the buffer 31. For sake of example, it is assumed that buffer 31 is an eight-word buffer capable of storing eight separately addressable data words. In this case, the buffer address counter 32 is a 3-bit counter which wraps back to zero when the maximum count is exceeded. Counter 32 may be parallel loaded from the microprocessor bus 28 by the microprocessor 25.

For the case of a write to system storage operation, buffer 31 is loaded with the necessary number of data words for a complete packet before the packet transfer is commenced. This is accomplished by parallel loading each data word into the buffer 31 from the microprocessor bus 28. After each word is parallel loaded, microprocessor 25 causes an incrementing of the buffer address counter 32 by means of a signal supplied by way of a conductor 33 and OR circuit 34 to the INC (increment) input of the counter 32. This signal may be the trailing edge of the same microprocessor (MP) pulse on conductor 35 which caused the loading of the data word into buffer 31. The large unfilled dot at the INC input of counter 32 signifies that this input is responsive to negative- going or trailing edge signal transitions. The data words which are loaded into the buffer 31 may be obtained from a temporary storage area in RAM 27.

For the case of a read from system storage operation, the multi-word buffer 31 is initially considered to be empty and the data words in the incoming packet are loaded into the buffer 31 from the system bus 14. This will be discussed at greater length hereinafter.

The I/O control unit of FIG. 3 also include bus request means for coupling to the system bus for requesting use of the bus by the I/O unit. This bus request means includes a set-reset type flip-flop (FF) circuit 36, the output of which is coupled by way of a driver (D) circuit 37 to a request (REQ) control line 38. which is one of the control lines in the system bus 14 of FIG. 1. Request flip-flop 36 is placed in the set condition by means of a signal supplied to the set (S)input thereof by microprocessor 25 via bus 28 and conductor 39. When in the set condition, flip-flop 36 activates the request line 38 to request use of the system bus 14 by the I/O control unit of FIG. 3.

The I/O control unit of FIG. 3 further includes bus acknowledgement means for coupling to the system bus 14 for receiving an acknowledgement signal granting use of the system bus 14 to the I/O unit. This bus acknowledgement means includes a set-reset type flip-flop (FF) circuit 40, the set (S) input of which is coupled by way of a receiver circuit 41 to an acknowledgement (ACK) control line 42, which is part of the system bus 14. When the bus control unit 13 of FIG. 1 decides to grant access to the I/O control unit of FIG. 3, it activates the ACK line 42. This places the ACK flip-flop 40 in a set condition. This activates the output line of the flip-flop 40. Among other things, this activation serves to reset (R) the request flip-flop 36, thus removing the FIG. 3 control unit request from the request control line 38.

The I/O control unit of FIG. 3 also includes first logic means (sometimes referred to herein as packet transfer control means) coupled to the address register 30 and to the buffer means 31 and responsive to each received acknowledgement signal on ACK control line 42 for causing a transfer of a data packet between the FIG. 3 I/O unit and the system storage unit 11 of FIG. 1. On a timewise scale, each such data packet is comprised of a system storage unit starting address field (word) followed by a sequence of data words. Each address word is placed on the system bus 14 by coupling the output of address register 30 to an address/data (A/D) bus 43 by way of a multiplexer 44 and a set of driver/receiver circuits 45. A/D bus 43 is part of the system bus 14. The address word from register 30 and the data words from buffer 31 are time-multiplexed onto this bus 43 by the multiplexer 44. An ASEL signal is used to control the setting of multiplexer 44. If the ASEL signal line is active, then register 30 is connected to the driver/receiver circuits 45. Otherwise, the data word buffer 31 is coupled to the driver/receiver circuits 45.

Driver/receiver circuits 45 include a set of driver circuits and a separate parallel set of receiver circuits for transferring signals between the multiplexer 44 and the A/D bus 43. A direction (DIR) control signal determines whether the drivers or, alternatively, the receivers are active at any given moment. This is a mutually exclusive condition. Both drivers and receivers cannot be active at the same time. In the illustrated embodiment, if the DIR signal is high, the receiver circuits are activated to transfer signals from the A/D bus 43 to the multiplexer 44. Conversely, if the DIR signal is low, the driver circuits are activated to transfer signals in the opposite direction, namely, from the multiplexer 44 to the A/D bus 43. The foregoing considerations are qu... fied by the use of an enabling (EN) control signal w? is also supplied to the driver/receiver circuits 45. If enabling signal is high, then the set of circuits selected by the direction (DIR) signal is activated to provide their signal transfer functions. If, on the other hand, the enabling (EN) signal is low, then the driver/receiver circuits 45 are completely disabled and nothing is transferred either way. During this disabled condition, the driver/receiver circuits 45 present a high impedance condition to the A/D bus 43.

When doing a read from system storage operation, the data word buffer 31 is coupled to the multiplexer 44 by means of a set of gated signal transfer circuits 46. When doing a write to system storage operation, the data words in buffer 31 are read out and transferred one at a time by way of a register 47 and a set of signal transfer gates 48 to the multiplexer 44.

A read/write (R/W) control flip-flop 50 determines which of the signal paths between buffer 31 and multiplexer 44 is active. With respect to the flip-flop 50, "read" means that data is to be read out of the system storage unit 11 of FIG. 1 and transferred to the I/O control unit of FIG. 3. The term "write" for flip-flop 50 means that data is to be read out of the multi-word buffer 31 and transferred via the system bus 14 to the system storage unit 11 of FIG. 1. In other words, the terms reading and writing refer to what is being done to the system storage unit 11. R/W flip-flop 50 is placed in the appropriate set or reset condition by the microprocessor 25 as part of the initial setup for the transfer of a packet. One of these conditions activates the read output line and the other of these conditions activates the write output line.

For a system storage read operation, the data words are transferred via driver/receivers 45, multiplexer 44 and a set of gate circuits 46 to the multi-word buffer 31. A system (SYS) load signal is supplied to the buffer 31 for each incoming data word by an AND circuit 51 which is primed by the read output of flip-flop 50. The loading of each word is commenced by the leading edge of a Ready (RDY) pulse supplied to the second input of AND circuit 51.

During a system storage write operation, the data words in buffer 31 are loaded one at a time into a register 47. During such write operation, a set of gating circuits 48 is continuously enabled so that the data word in register 47 is transferred by such gating circuits 48, multiplexer 44 and driver/receivers 45 to the address/data bus 43. Loading of the register 47 is controlled by an AND circuit 52 which is primed by the write signal from flip-flop 50. The loading of each word is commenced by the trailing edge of the Ready (RDY) signal which is supplied to the second input of AND circuit 52. The unfilled circle at this second input indicates that the RDY signal is inverted before it is injected into the AND circuit 52. This enables the trailing edge to be the activating edge of the RDY signal.

Figure 4:
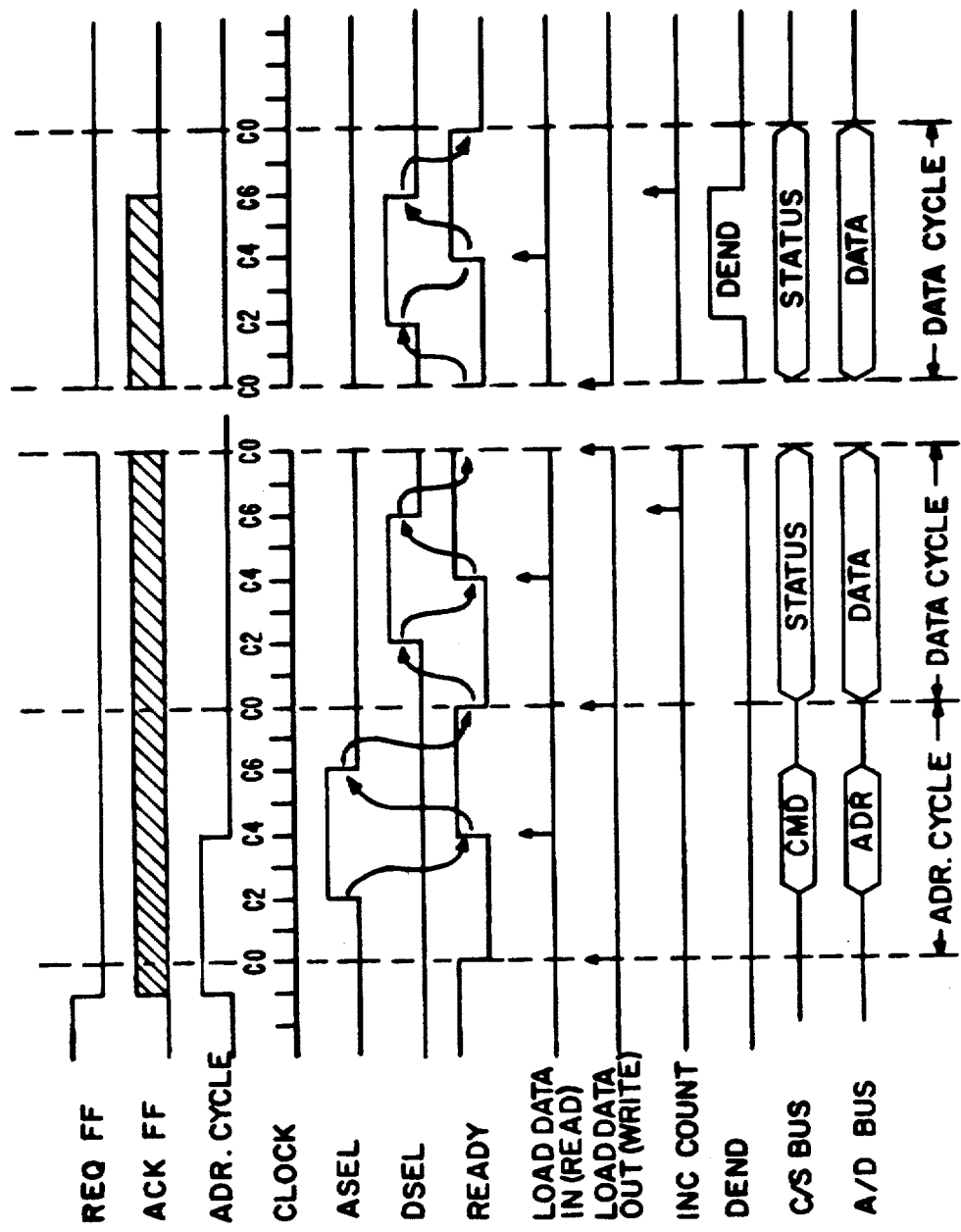
FIG. 4 is a timing diagram used in explaining the operation of the FIG. 3 control unit.

At this point, it will be helpful to commence referring to the timing diagram of FIG. 4, which shows various signal waveforms which are present at different points in the control unit of FIG. 3. The REQ FF waveform shows the signal at the output of the request flip-flop 36, while the ACK FF waveform shows the signal at the output of the acknowledgement flip-flop 40. Note that the going high of the ACK FF signal resets the request flip-flop 36 to cause the REQ FF signal to go low. This removes the system bus use request for the FIG. 3 control unit from the system bus request line 38.

One thing that needs to be done is to provide some means for distinguishing between address cycles and data word cycles in each data packet. This is accomplished by means of an address cycle flip-flop circuit 53. This flip-flop 53 is placed in its set (S) condition by the leading edge of the acknowledgement signal appearing at the output of ACK FF 40. Address cycle flip-flop 53 is reset (R) by the next occurring positive-going transition in the Ready (RDY) signal received from the bus control unit 13 of FIG. 1. This signal is supplied by way of a Ready line 54 in the system bus 14 to a receiver (R) circuit 55 in the FIG. 3 control unit. The output of receiver 55 is connected to various places, including the reset terminal of the address cycle flip-flop 53. Receiver 55 can pass signals only when the signal level at its enabling (EN) control terminal is high. The output of the ACK flip-flop 40 is connected to this EN terminal so that the receiver 55 is enabled during substantially all of the packet transfer operations for a particular packet.

The next order of business is to explain the development of the address select (ASEL) and the data select (DSEL) signals which are used to communicate with the bus control unit 13. These signals are respectively generated by an ASEL flip-flop circuit 56 and a DSEL flip-flop circuit 57. The logic for controlling the ASEL and DSEL flip-flops includes a clock pulse generator 58 for producing, on separate output lines thereof, a sequence of timing pulses for each address cycle and each data cycle of a data packet. These timing pulses are shown by the CLOCK waveform of FIG. 4. The different individual timing pulses C$\phi$, C1, C2, etc., are produced on different ones of the output lines of the clock generator 58. This clock generator 58 may take the form of, for example, a ring counter driven by a constant frequency pulse generator. Clock 58 is reset to zero at the beginning of each address or data cycle by a reset signal provided by AND circuit 59, which is enabled by the acknowledgement signal from flip-flop 40. The resetting of clock 58 is produced by the negative-going or trailing edge of the ready signal which is supplied to the other terminal of AND circuit 59. This resetting of clock 58 at the start of each cycle helps keep clock 58 in step with the address and data transfers.

The address select (ASEL) flip-flop 56 is placed in a set condition by the occurrence of a high level at the output of an AND circuit 60. This occurs at the occurrence of the C2 clock pulse provided the Ready signal is low and the address cycle flip-flop 53 is in a set condition, which condition indicates that this is, in fact, an address cycle. The ASEL flip-flop 56 is reset by the appearance of a positive-going signal at the output of an AND circuit 61. This positive-going transition is produced by the C6 clock pulse provided the Ready signal is high, which is normally the case during the last half of the address cycle, which is when the C6 clock pulse should be occurring. The resulting ASEL pulse produced at the output of flip-flop 56 is shown by the ASEL waveform of FIG. 4. It occurs only during the address cycle of each data packet. This ASEL signal is supplied by way of a driver circuit 62 to the ASEL control line 63 in the system bus 14. Driver 62 passes signals only when enabled by the ACK signal from flip-flop 40. The ACK signal is present during substantially the entire duration of the packet transfer interval.

The data select (DSEL) flip-flop 57 is placed in a set condition by a positive-going signal transition appearing at the output of an AND circuit 64. This occurs at the occurrence of the C2 clock pulse, provided the ACK signal is high, the Ready signal is low and the output of address cycle flip-flop 53 indicates that it is not an address cycle. DSEL flip-flop 57 is reset by the AND circuit 61, which resetting normally occurs at the occurrence of the C6 clock pulse. The resulting waveform appearing at the output of the DSEL flip-flop 57 is shown by the DSEL waveform of FIG. 4. As there seen, a DSEL pulse is produced during the occurrence of each data cycle. These DSEL pulses are supplied by way of a driver circuit 65 to the DSEL control line 66 in the system bus 14, provided the driver 65 is being enabled by the ACK signal.

The ASEL signal is used to tell the bus control unit 13 that there is a valid address word on the A/D bus 43. For the case of a write to system storage operation, the DSEL pulses tell the bus control unit 13 that there are valid data words on the A/D bus 43. For a read operation, each DSEL pulse tells the bus control unit 13 that the FIG. 3 control unit is ready to accept a data word. For an address cycle, the Ready pulse received back from the bus control unit 13 tells the FIG. 3 control unit that the address word has been accepted. During a write-type data cycle, the Ready pulse tells the control unit that the data word has been accepted. During a read-type data cycle, the Ready pulse tells the control unit that valid data is present on the A/D bus 43 and is ready to be taken in. As indicated by the light curved arrows in FIG. 4, the select and ready pulses pace each other in a handshaking manner.

The ASEL and DSEL pulses are also used to control various other units within the FIG. 3 control unit. The ASEL pulse, for example, is used to switch the multiplexer 44 to the address register 30 during the occurrence of an address cycle. In the absence of the ASEL pulse, the multiplexer 44 is switched to be connected to the gates 46 and 48. The DSEL pulse is supplied, for example, to an AND circuit 67 to control the signal transfer direction for drivers/receivers 45. Thus, during the occurrence of a read operation, each DSEL pulse serves to place drivers/receivers 45 in a receiving mode for passing data words from the A/D bus 43 to the multiplexer 44. Otherwise, the D/R circuits 45 are in a driving mode for driving the A/D bus 43.

For the case of a system storage read operation, the moments of loading of incoming data words into the data word buffer 31 are represented by the "Load Data In" waveform of FIG. 4. As indicated by the arrows, a data word is loaded into the buffer 31 by the occurrence of the leading edge of a Ready pulse. This is determined by the AND circuit 51, which drives the system load terminal of the buffer 31. During a system storage write operation, the moments of loading for the register 47 are represented by the "Load Data Out" waveform of FIG. 4. As there indicated by the arrows, the negative-going or trailing edge of each ready pulse serves to load the data word then appearing at the output of buffer 31 into the register 47. These moments of loading are determined by the AND circuit 52 which drives the load terminal of register 47 and which receives, as one of its inputs, the Ready signal which controls the moments of loading.

An important function of the DSEL signal produced by flip-flop 57 is the incrementing of the buffer address counter 32 to enable the next data word location in buffer 31 to be accessed. This DSEL signal is supplied by way of the OR circuit 34 to the increment (INC) terminal of the counter 32. As indicated by the unfilled circle at this input terminal, the trailing edge of the DSEL signal is used to increment the counter 32 by one count. These moments of incrementing are represented by the arrows on the INC COUNT waveform of FIG. 4.

Assume for the moment that a write to the system storage operation is being performed and that the microprocessor 25 has already loaded four data words into the buffer 31. Further assume that the microprocessor has set the counter 32 to a value of zero. This zero count accesses the first word location in buffer 31 and makes its contents available to the register 47. The trailing edge of the Ready pulse occurring at the beginning of the data cycle loads this first data word into the register 47 and the counter 32 is incremented by the trailing edge of the DSEL pulse occurring during this same data cycle. The counter 32 then accesses the second word location in the buffer 31 to make the second data word available for loading into the register 47. After loading of this second data word, the counter 32 is again incremented to access the third data word in the buffer 31. In this manner, the trailing edges of the DSEL pulses continue to increment the counter 32 until all four data words have been accessed and sent to the system storage unit. The DSEL incrementing of counter 32 is also provided for system storage read operations. In this case, the incrementing enables successive data words received by the FIG. 3 control unit to be stored at successive word locations in the buffer 31.

In accordance with the present invention, the I/O control unit of FIG. 3 further includes second logic means (sometimes referred to herein as packet size adjusting means) coupled to the first logic means (the packet transfer control means) and responsive to the system storage line size signal for limiting the number of data words transferred with each packet so that the number of data words transferred does not exceed the line size of the system storage unit. This packet size adjusting means includes a decoder circuit 70 for receiving the system storage line size signal provided by the bus control unit 13. More particularly, the input terminals of the decoder 70 are coupled by way of individual receiver circuits 71 and 72 to the respective ones of the LLI$\phi$ and LLI1 signal lines of FIG. 1. These signal lines provide the bit signals which make up the plural-bit binary coded line size signal. Decoder 70 decodes this line size signal and activates one, and only one, of its various output lines 73-76. Line 73 is activated if the LLI coding indicates a line size of one word. Output line 74 is activated if the LLI coding denotes a line size of two words. The output line 75 is activated if the coding indicates a line size of four words. The output line 76 is activated if the coding indicates a line size value of eight words.

The packet size adjusting means also includes means for comparing the storage system line size value with the count in the buffer address counter 32 for determining when the number of data words transferred becomes equal to the system storage line size. This comparing means is comprised of a set of AND circuits 77, 78, 79 and 80. Each of the decoder output lines 73-76 is connected to a different one of these AND circuits 77-80. With the exception of the first AND circuit 77, there is also connected to the input of these AND circuits one or more of the output lines of the buffer address counter 32. The data select (DSEL) signal produced by the DSEL flip-flop 57 is supplied to each and every one of the AND circuits 77-80. This means that the comparison function will only be enabled during the course of a DSEL pulse. The output of AND circuits 77-80 are connected to a like number of inputs of an OR circuit 81.

The signal appearing at the output of OR circuit 81 is called a data end (DEND) signal. The occurrence of a DEND signal signifies that the end of a packet has been reached. It may also signify that the number of data words transferred has become equal to the system storage line size, if such DEND signal is obtained from one of the AND circuits 77-80 and if the transfer started at a storage line boundary. As will be seen, this DEND signal is used to terminate the packet transfer operation for the current packet. As seen from either FIG. 2 or FIG. 4, this DEND pulse is coincident in time with the last DSEL pulse in each packet.

If the system storage line size has a value of one word, then decoder output line 73 is activated and the AND circuit 77 produces a DEND signal for the first occurring DSEL pulse following transfer of the address word in address register 30. In this case, there is no need to look at the count value in the buffer address counter 32, since the occurrence of the DSEL pulse indicates that the one data word is being transferred.

If the system storage line size value is two words, then decoder output line 74 is activated and the AND circuit 78 produces a DEND output pulse when the count in buffer address counter indicates that the second data word is being transferred. If the line size is four words, AND circuit 79 produces the DEND pulse when the fourth data word is being transferred. If the line size is eight words, then AND circuit 80 produces a DEND pulse when the eighth data word is being transferred.

A DEND pulse can also be produced by a word counter 82. This is useful, for example, where less than a full packet is to be transferred. Assume, for example, that the system storage line size is four words, but the control unit only has two data words to be transferred. In this case, the word counter 82 is loaded with a count value of one and is decremented by the trailing edge of each DSEL pulse. Thus, counter 82 is decremented to zero at the end of the first DSEL pulse. This zero value produces an output signal which is applied to an AND circuit 83 and the next occurring DSEL pulse (the second DSEL pulse) causes the AND circuit 83 to produce a DEND pulse which is applied to the OR circuit 81. A flip-flop circuit 84 is employed to prevent AND circuit 83 from producing a DEND signal when no number value has been loaded into the word counter 82. Flip-flop 84 is placed in a set condition when the word counter 82 is loaded and is reset by the trailing edge of the output pulse produced by AND circuit 83. When flip-flop 84 is in the reset condition, AND circuit 83 is disabled.

The DEND signal occurring at the output of OR circuit 81 is supplied to the bus control unit 13 to signal the end of a data packet. This is accomplished by way of a driver circuit 85 and a DEND signal line 86 in the system bus 14, the output of the driver 85 being connected to the signal line 86. The DEND signal at the output of OR circuit 81 is also supplied to the reset terminal of the acknowledgement flip-flop 40. The negative-going or trailing edge of the DEND signal is effective to reset the ACK flip-flop 40. This, in effect, disconnects the FIG. 3 control unit from the system bus 14 insofar as data transfer purposes are concerned. The DEND signal is also supplied by way of microprocessor bus 28 to the microprocessor 25 to tell it that the packet transfer has been completed.

In order to transfer another data packet, the FIG. 3 control unit must again activate the request line 38 and await the receipt of an acknowledgement signal on the ACK line 42. In other words, the foregoing type of request/acknowledgement operation is repeated every time it is desired to transfer a data packet from the FIG. 3 control unit to the FIG. 1 system storage unit 11 or vice versa.

The FIG. 3 control unit also includes means for transferring command words from the control unit to the bus control unit 13 and for transferring status words from the bus control unit 13 to the control unit of FIG. 3. To this end, the FIG. 3 control unit includes a command register 87 and a status register 88 which are coupled to a multiplexer 89 which, in turn, is coupled by way of driver/receiver circuits 90 to a command/status (C/S) bus 91. C/S bus 91 is part of the system bus 14. As indicated in FIG. 4, a command word is sent to the bus control unit 13 during the address cycle of each packet. As further indicated, a status word is received from the bus control unit 13 during each data cycle of a packet.

The command register 87 is parallel loaded from the microprocessor bus 28 by the microprocessor 25. During the address cycle of a packet, the command word therein is supplied by way of multiplexer 89 and driver circuits in driver/receiver 90 to the C/S bus 91. The ASEL signal switches the multiplexer 89 to the command register 87 and activates the driver portion of driver/receiver 90 for this time interval. During each data cycle of a packet, the receiver portion of driver/receiver 90 is active and the multiplexer 89 is switched to the status register 88. Each incoming status word is loaded into the status register 88 by a load signal provided by AND circuit 92. This AND circuit 92 is enabled by the DSEL pulse and the leading edge of the Ready signal is effective to initiate loading of the status register 88. The status words in register 88 are made available to microprocessor 25 via bus 28 for use thereby.

The I/O device associated with the control unit of FIG. 3 is coupled thereto by connecting such I/0 device to driver/receiver circuits 97 located in the control unit.

A primary purpose of the packet size adjusting mechanism described above is to limit the number of data words per packet so that the number per packet does not exceed the line size of the system storage unit 11. Assume, for example, that the line size of the system storage unit 11 is four words and that the normal data transfer size of the FIG. 3 I/O unit is eight words per packet. Further, assume that the transfer operation is a write to system storage operation and that the starting address in the system storage unit 11 corresponds to a system storage line address boundary. In this case, the microprocessor 25 loads eight data words into the buffer 31 and sets the buffer address counter 32 to an initial count of zero. The data transfer operation thereafter proceeds as described above with one data word at a time being transferred from the buffer 31 to the A/D bus 43 and with the buffer address counter 32 being incremented by one count as each data word is transferred.

For the assumed storage line size of four words, the line length indicator signal on lines LLI$\phi$ and LLI1 causes decoder 70 to activate its four word output line 75. The data transfer continues until the count in buffer address counter 32 reaches a binary count of "011", which signifies that the fourth data byte is being transferred. This activates the two signal lines 93 and 94 running from the buffer address counter output to the AND circuit 79. Since the four word output line 75 from decoder 70 is also being activated, this enables the AND circuit 79 to produce an output signal for the DSEL pulse which occurs for the transfer of the fourth data word. This signal is supplied to OR circuit 81 and produces the DEND data end pulse on its output line. This terminates the packet transfer operation and disconnects the FIG. 3 control unit from the A/D bus 43. In order to transfer the remaining four data words, it is necessary for the control unit of FIG. 3 to again request use of the system bus and to await the receipt of a new acknowledgement signal on ACK line 42. In this manner, the packet size is limited so as not to exceed four data words per packet.

The FIG. 3 control unit operates to limit the number of data words per packet so that they do not cross a system storage unit line address boundary. If a packet transfer starts within a system storage line and increments to a line boundary, then the FIG. 3 control unit ends the packet and disconnects itself from the system bus. If more data remains to be transferred, the FIG. 3 control unit issues a new system bus request and starts a new packet transfer. Once the packets are aligned with the system storage line boundies, the FIG. 3 control unit may transfer full packets equal to or less than the system storage line size.

As indicated above, an I/O unit with a normal packet size greater than that indicated by the LLI line length indicator signal must disconnect itself and issue a new system bus request each time the system storage line size value is reached. This is done in such a manner that a system storage line boundary is not crossed. So long as each new packet starts at a line boundary, the non-crossing of the next line boundary occurs automatically in that the packet size is limited so as not to exceed the storage unit line size.

An interesting case occurs where the packet transfer is to start in the middle of a storage line and not at the beginning. In this case, the buffer address counter is not initially reset to zero. It is instead initially loaded with the same lower order address bits as are loaded into the system storage address register 30. This provides the same storage line boundary offset for the buffer address counter 32 as is provided for the address register 30. As a result, the DEND data end signal will, in fact, be produced when the buffer address counter 32 increments to the next storage unit line boundary. Thus, the comparing action provided by AND circuits 77–80 also prevents the crossing of a line boundary provided that the buffer address counter 32 is initially provided with the same address offset as is provided for the storage unit address register 30.

Another interesting case occurs where the number of data words remaining to be transferred is less than a full packet. Assume, for example, that the packet size allowed by the line length indicator signal is four words but that only two data words remain to be transferred. The system can, of course, be allowed to operate as described above so as to perform all the steps necessary for transferring a four word packet, in which case the last two word transfers would be blank words in the sense that they do not contain valid data. This is somewhat wasteful of time.

Such inefficiency is eliminated by the use of the word counter 82. As part of the preliminary setup for a data transfer session, the word counter 82 is loaded with a count representing the total number of data words to be transferred. This word counter 82 is thereafter decremented each time a data word is transferred. When the count in the counter 82 reaches a value of zero, an AND circuit 83 is activated to enable the DSEL signal for the last transferred data word to produce a DEND data end signal. As before, this terminates the packet transfer operation and disconnects the FIG. 3 control unit from the system bus. Thus, for the foregoing example, if the last data word is being transferred before the AND circuit 79 is ready to produce a DEND signal, then such DEND signal will nevertheless be produced by the word counter 82 and AND circuit 83.

One more matter need be considered, namely, the question of what is done for the case of a control unit whose normal operation data transfer size (data words per packet) is less than the system storage line size. Assure, for example, that the normal operation of the FIG. 3 control unit is to transfer two word data packets and that the system storage line size is four words. One mode of operation would be to allow this two-word I/O unit to continue to transfer two word data packets. This could be accomplished by preparing the buffer address counter 32 and the data word buffer 31 for a two word transfer when the packet transfer request is to be issued. This is accomplished by setting the buffer address counter 32 to an initial count of two, as opposed to an intial count of zero. This will produce the desired DEND data end signal when the second data word is being transferred.

If the size of the data word buffer 31 is large enough to allow it, then a more efficient mode of operation is to cause the control unit to transfer four word packets instead of two word packets. In this regard, the LLI line length indicator signal is supplied to the microprocessor 25 by way of lines 95 and 96 which are included in the microprocessor bus 28. The microprocessor 25 then knows the system storage line size and can operate the data word buffer 31 and the buffer address counter 32 so as to match this system storage line size. For the case of a system storage write operation, for example, the microprocessor 25 would load the word buffer 31 with the proper number of words, as indicated by the LLI line length indicator signal and, assuming the packet is to start at a line boundary, would reset the buffer address counter 32 to zero. For this mode of operation, the I/O control unit automatically adapts itself to the system storage line size represented by the LLI line length indicator signal.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a data processing system having a system bus coupling I/O units which I/O units transmit data word packets to a system storage unit with a predetermined data work line size through a bus control unit for passing the data word packets between the storage system and the I/O units, the improvement comprising:
    means for supplying to the I/O units a line size signal representing the data word line size of the system storage unit;
    and means located in at least one of the I/O units and responsive to the data word line size signal for adjusting the data words per packet size of the I/O unit to match the system storage unit data word line size;
    whereby the words per packet transferred from or to the I/O unit match the data word line size of the system storage unit.

2. The improvement of claim 1 wherein the line size signal is a plural-bit binary coded signal.

3. The improvement of claim 1 wherein the line size signal is supplied via separate dedicated signal conductors associated with the system bus.

4. The improvement of claim 1 wherein the line size signal is supplied via a status byte transferred over the system bus to the I/O control units.

5. In a data processing system having a system bus coupling I/O units to a system storage unit with a predetermined data word line size through a bus control unit for passing the data word packets between the storage system and the I/O units, the improvement comprising:
    means for supplying a line size signal representing the data word line size of the system storage unit;
    and means located in at least one of the I/O units for transferring a packet of time sequential data words to or from the system storage unit and responsive to the data word line size signal for adjusting the number of words in the packet to match the system storage unit line size with a predetermined data word line size through a bus control unit for passing the data word packets between the storage system and the I/O units.

6. An I/O unit for use in a data processing system having a system storage unit, a system bus for coupling I/O units to the system storage unit, a bus arbitration mechanism for receiving request signals from I/O units and supplying an acknowledgement signal to a selected I/O unit and means for supplying to I/O units a line size signal representing the line size of the system storage unit, such I/O unit comprising:
    address register means for holding a system storage unit starting address;
    buffer means for holding a plurality of data words;
    bus request means for coupling to the system bus for requesting use of the bus by the I/O unit;
    bus acknowledgement means for coupling to the system bus for receiving an acknowledgement signal granting use of the system bus to the I/O unit;
    first logic means coupled to the address register means and to the buffer means and responsive to a received acknowledgement signal for causing a transfer of a starting address from the address register means to the system bus and for causing a sequential transfer of a plurality of data words between the system bus and the buffer means;
    and second logic means coupled to the first logic means and responsive to the line size signal for limiting the member of data words transferred with the starting address so that the number of data words transferred does not exceed the line size of the system storage unit.

7. An I/O unit in accordance with claim 6 wherein the second logic means adjusts the number of data words transferred with the starting address so that the number of data words transferred matches the line size of the system storage unit.

8. A packet transfer type I/O unit which data is in word packets for use in a data processing system having a system storage unit with a predetermined data line size, a system bus for coupling the I/O units to the system storage unit through a bus control unit, a bus arbitration mechanism connected to the systems bus for receiving request signals from I/O units and supplying an acknowledgement signal to a selected I/O unit and means for supplying to I/O units a line size signal representing the line size of the system storage unit, such packet transfer type I/O unit comprising:
    address register means for holding a system storage unit starting address;
    buffer means for holding a plurality of data words;
    bus request means for coupling to the system bus for requesting use of the bus by the I/O unit;
    bus acknowledgement means for coupling to the system bus for receiving an acknowledgement signal granting use of the system bus to the I/O unit;
    packet transfer control means coupled to the address register means and to the buffer means and responsive to each received acknowledgement signal for causing a transfer of a data packet between the I/O unit and the system storage unit, each such data packet being comprised of a system storage unit starting address field followed by a sequence of data words;
    and packet size adjusting means coupled to the first logic means and responsive to the line size signal for adjusting the number of data words in each full packet to match the line size of the system storage unit.

* * * * *